(12) United States Patent
Bradfield

(10) Patent No.: US 8,378,550 B2
(45) Date of Patent: Feb. 19, 2013

(54) ELECTRIC MACHINE INCLUDING A STATOR HAVING A STATOR SLEEVE AND METHOD OF COOLING A STATOR

(75) Inventor: Michael D. Bradfield, Anderson, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 153 days.

(21) Appl. No.: 12/879,618

(22) Filed: Sep. 10, 2010

(65) Prior Publication Data

US 2012/0062056 A1    Mar. 15, 2012

(51) Int. Cl.
*H02K 9/00* (2006.01)
(52) U.S. Cl. ............... 310/260; 310/54; 310/57; 310/58
(58) Field of Classification Search .................. 310/260, 310/52, 54, 57–59, 60 A, 64
See application file for complete search history.

(56) References Cited

U.S. PATENT DOCUMENTS

| | | | | |
|---|---|---|---|---|
| 2,873,393 A | * | 2/1959 | Baudry | 310/55 |
| 2,975,309 A | * | 3/1961 | Seidner | 310/54 |
| 3,574,325 A | * | 4/1971 | Agarwal | 188/156 |
| 3,995,181 A | * | 11/1976 | Suit | 310/58 |
| 4,413,201 A | * | 11/1983 | Nikitin et al. | 310/260 |
| 4,517,479 A | * | 5/1985 | Aleem et al. | 310/54 |
| 5,798,586 A | * | 8/1998 | Adachi | 310/54 |
| 6,211,587 B1 | * | 4/2001 | Enomoto et al. | 310/52 |
| 6,617,716 B2 | * | 9/2003 | Ishida | 310/58 |
| 7,061,148 B2 | * | 6/2006 | Philippart | 310/58 |
| 2003/0006664 A1 | | 1/2003 | Eggers et al. | |

FOREIGN PATENT DOCUMENTS

| | | |
|---|---|---|
| JP | 200472949 A | 3/2004 |
| JP | 2004201492 A | 7/2004 |
| JP | 201051130 A | 3/2010 |
| KR | 20060068667 A | 6/2006 |

OTHER PUBLICATIONS

International Search Report for corresponding PCT Application No. PCT/US2011/049823, dated Mar. 19, 2012, pp. 1-10.

* cited by examiner

*Primary Examiner* — Dang Le
(74) *Attorney, Agent, or Firm* — Cantor Colburn LLP

(57) ABSTRACT

An electric machine including a housing, and a stator mounted relative to the housing. The stator includes a body including a first end portion that extends to a second end portion and a plurality of stator windings that extend between the first and second end portions. A sleeve member is mounted to the stator and covers a portion of the stator windings at one of the first and second end portions. The sleeve member is configured and disposed to guide a coolant over the portion of the stator windings to remove heat from the stator.

16 Claims, 4 Drawing Sheets

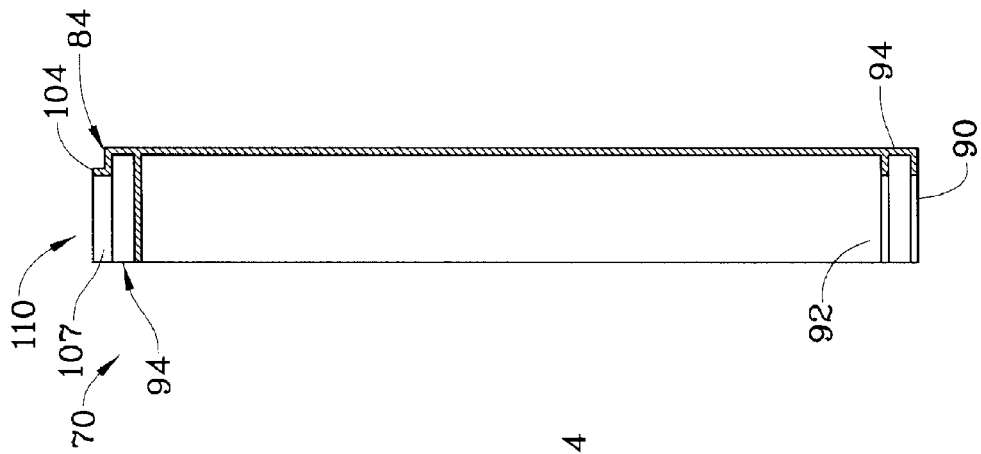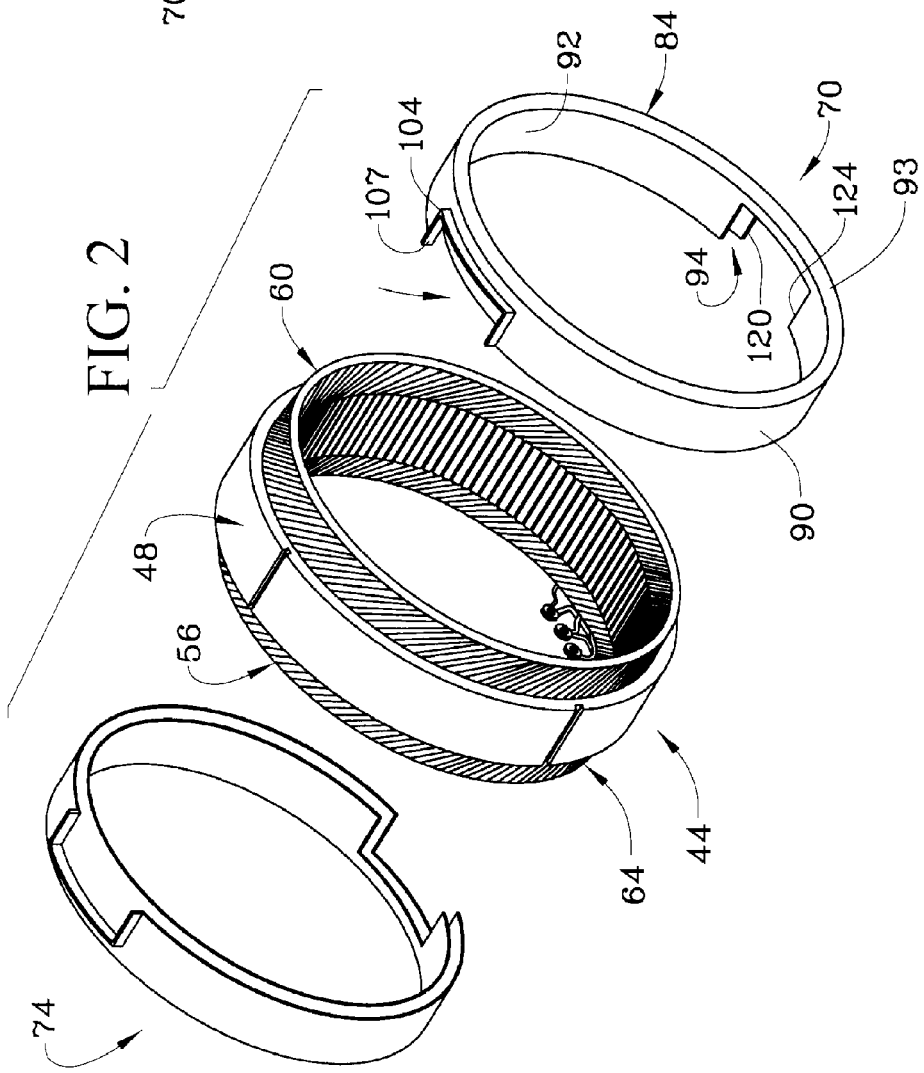

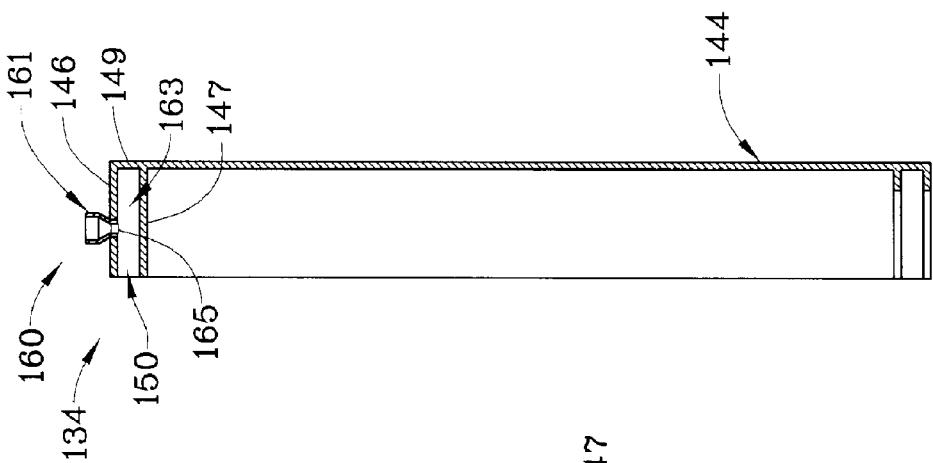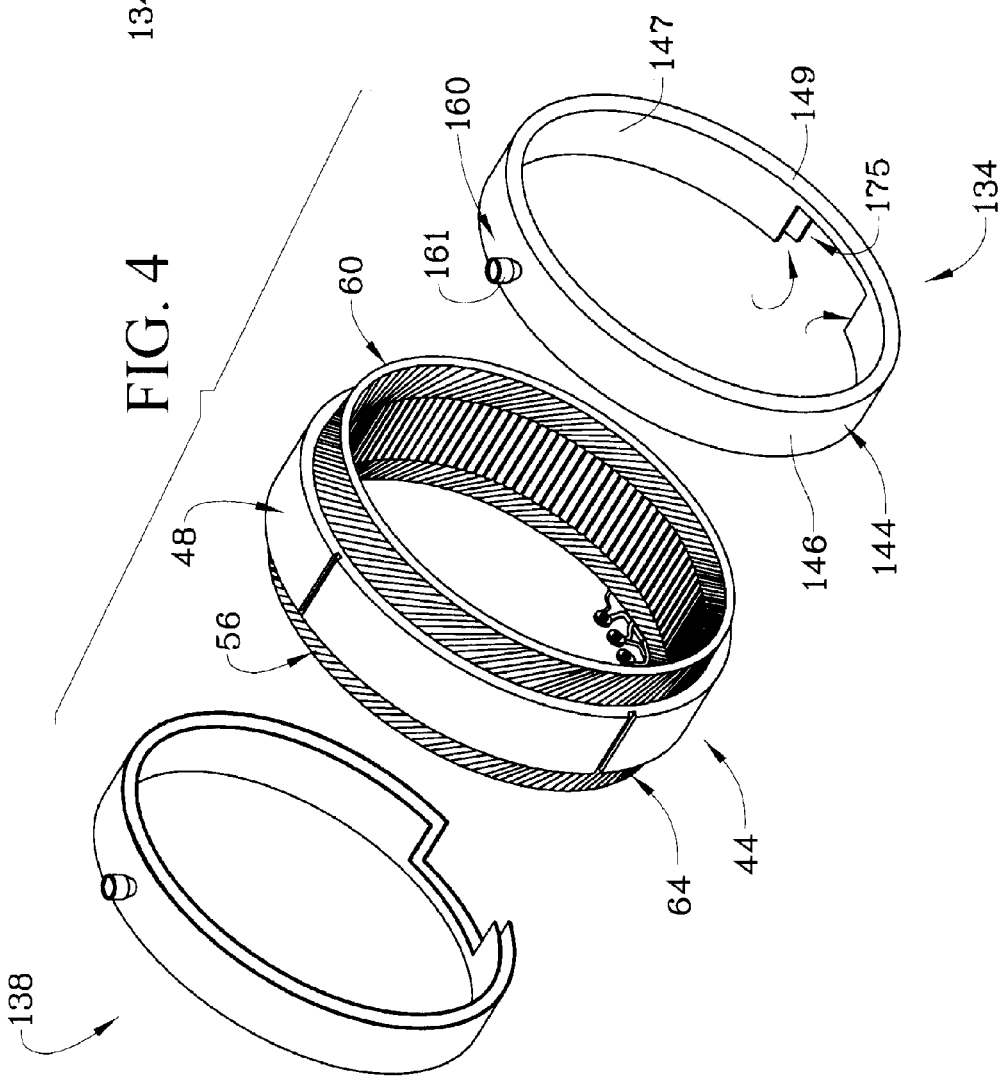

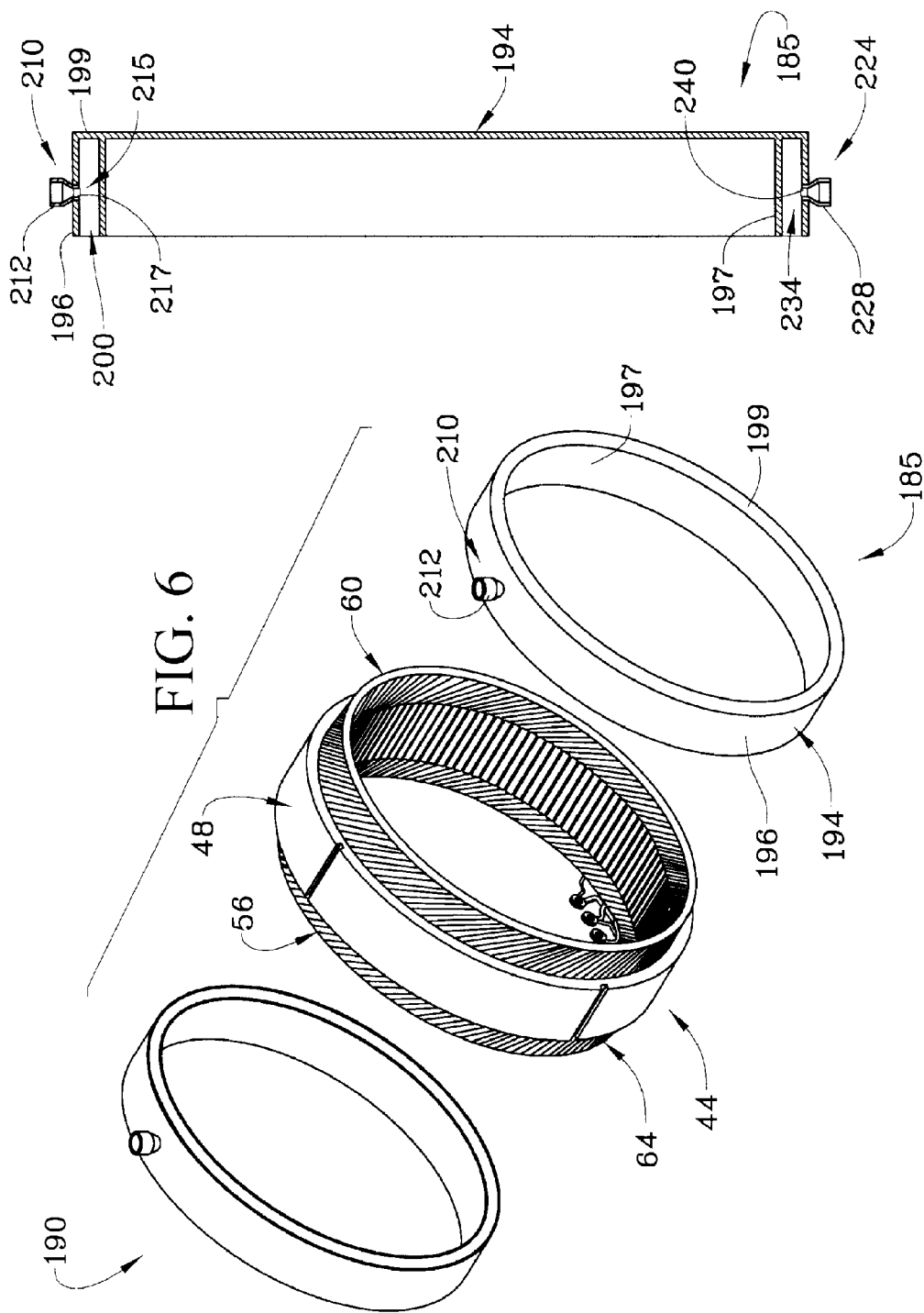

ELECTRIC MACHINE INCLUDING A STATOR HAVING A STATOR SLEEVE AND METHOD OF COOLING A STATOR

BACKGROUND OF THE INVENTION

Exemplary embodiments pertain to the art of electric machines and, more particularly, to an electric machine including a stator having a stator sleeve.

Electric machines utilize various fluids for cooling internal components. In certain cases, air is passed through a housing of the electric machine to cool internal components. In other cases, a liquid coolant, typically an oil, is passed over various internal components of the electric machine. The oil is sprayed onto end turn portions at an upper region of the stator. The oil runs/drips under force of gravity through the end turn portions from the upper region to a lower region of the stator. The oil is collected in the lower region, often times cooled, and re-introduced to the electric machine at the upper region of the stator.

BRIEF DESCRIPTION OF THE INVENTION

Disclosed is an electric machine including a housing, and a stator mounted relative to the housing. The stator includes a body including a first end portion that extends to a second end portion and a plurality of stator windings that extend between the first and second end portions. A sleeve member is mounted to the stator and covers a portion of the stator windings at one of the first and second end portions. The sleeve member is configured and disposed to guide a coolant over the portion of the stator windings to remove heat from the stator.

Also disclosed is a method of cooling an electric machine stator. The method includes guiding a coolant through an inlet of a stator sleeve, passing the coolant onto a portion of a plurality of stator windings of the electric machine stator, flowing the coolant between the stator sleeve and the portion of the plurality of stator windings, and discharging the cooling through an opening in the stator sleeve.

BRIEF DESCRIPTION OF THE DRAWINGS

The following descriptions should not be considered limiting in any way. With reference to the accompanying drawings, like elements are numbered alike:

FIG. 2 is an exploded view of the stator and first and second stator sleeves of FIG. 1;

FIG. 3 is a cross-sectional view of the first stator sleeve of FIG. 2;

FIG. 4 is an exploded view of the stator and first and second stator sleeves in accordance with another aspect of the exemplary embodiment;

FIG. 5 is a cross-sectional view of the first stator sleeve of FIG. 4;

FIG. 6 is an exploded view of the stator and first and second stator sleeves in accordance with another aspect of the exemplary embodiment; and FIG. 7 is a cross-sectional view of the first stator sleeve of FIG. 6.

DETAILED DESCRIPTION OF THE INVENTION

Figure 1:
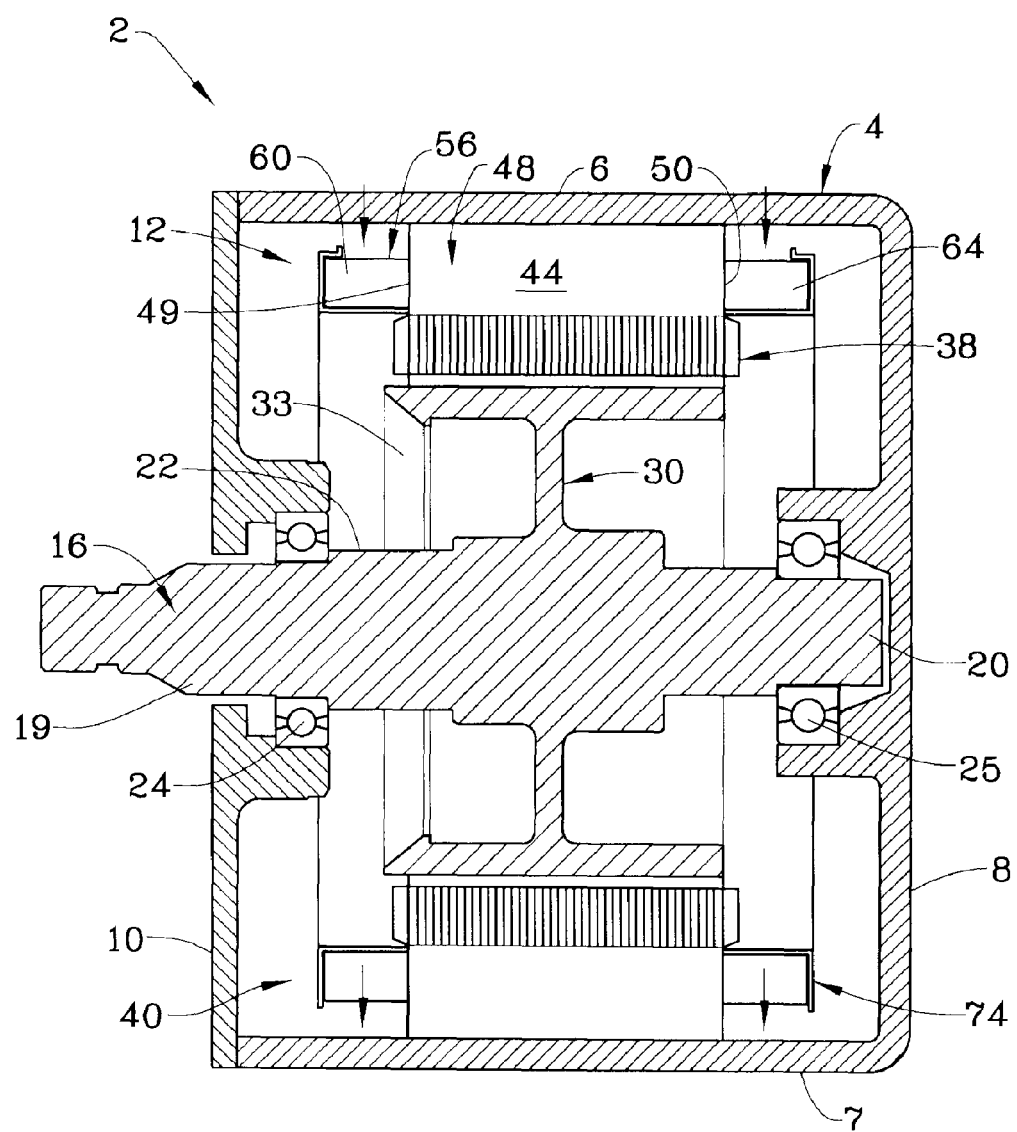
FIG. 1 is a cross-sectional view of an electric machine including a stator having first and second stator sleeves in accordance with an exemplary embodiment.

A detailed description of one or more embodiments of the disclosed apparatus and method are presented herein by way of exemplification and not limitation with reference to the Figures.

An electric machine in accordance with an exemplary embodiment is indicated generally at 2 in FIG. 1. Electric machine 2 includes a housing 4 having first and second side walls 6 and 7 that are joined by an end wall 8 and a front wall or cover 10 to collectively define an interior portion 12. Electric machine 2 includes a shaft 16 rotatably supported within housing 4. Shaft 16 includes a first end 19 that extends to a second end 20 through an intermediate portion 22. First end 19 is rotatably supported relative to front wall 10 through a first bearing 24 and second end 20 is rotatably supported relative to end wall 8 through a second bearing 25. Shaft 16 supports a rotor 30 that is rotatably mounted within housing 4. Rotor 30 includes a hub 33 that is fixed relative to intermediate portion 22 and a plurality of laminations 38. Plurality of laminations 38 are rotated relative to a stator 44 fixedly mounted to housing 4 to establish an electro-motive force.

Stator 44 includes a body 48 having a first end portion 49 that extends to a second end portion 50. Body 48 supports a plurality of slot segments or windings 56. Windings 56 include a first end turn portion 60 positioned at first end portion 50 and a second end turn portion 64 positioned at second end portion 50. Each end turn portion 60, 64 is bathed in a coolant (not shown) to reduce temperatures of stator 44. In order to enhance contact with the coolant, stator 44 includes a first sleeve member 70 positioned over first end turn portion 60 and a second sleeve member 74 positioned upon second end turn portion 64. As each sleeve member 70, 74 is similarly formed, a detailed description will follow with reference to FIGS. 2 and 3 in describing first sleeve member 70 with an understanding that second sleeve member 74 includes corresponding structure.

In accordance with an exemplary embodiment, first sleeve member 70 includes a body member 84 having an outer diametric wall 90, an inner diametric wall 92, and an end wall 93 that collectively define an annular coolant channel 94. Body member 84 is formed from a dielectric material. In accordance with one aspect of the exemplary embodiment, body member 84 is formed from plastic such as nylon or polyphenylene sulfide (PPS). First sleeve member 70 includes a projection 104 formed on outer diametric wall 90. Projection 104 includes an inner edge 107 that defines a first opening or inlet 110 into coolant channel 94. First sleeve member 70 is also shown to include a second opening 120 formed in outer diametric wall 90 at a position substantially opposite to first opening 110. In addition, first sleeve member 70 includes a third opening 124 that is formed on inner diametric wall 92 adjacent to second opening 120. First sleeve member 70 is configured to be mounted to stator 44 with first end winding portion 60 extending into coolant channel 94. First sleeve member 70 can be held in place by housing 4 or through various other mechanisms known to those of ordinary skill in the art.

With this arrangement, coolant, generally an oil, is introduced into housing 4 adjacent to first opening 110. The coolant passes through first opening 110 into coolant channel 94. The coolant flows over, through, and about first end winding portion 60 and absorbs heat. The coolant falls under a gravitational force, toward second opening 120 and passes from first sleeve member 70. At this point, entrained heat is removed and the coolant is re-circulated back toward first opening 110. In addition to receiving coolant through first opening 110, first sleeve member 70 may received coolant through third opening 124. That is, any coolant that may pass toward rotor 30 is guided to third opening 124 and discharged from first sleeve member 70. In this manner, coolant does not enter into an air gap portion (not separately labeled) between the plurality of laminations 38 and stator 44 and lower operational efficiency of electric machine 2.

Reference will now be made to FIGS. 4 and 5, wherein like reference numbers represent corresponding parts in the respective views, in describing first and second sleeve members 134 and 138 in accordance with another aspect of the exemplary embodiment. As each sleeve member 134, 138 is similarly formed, a detailed description will follow describing first sleeve member 134 with an understanding that second sleeve member 138 includes corresponding structure. First sleeve member 134 includes a body member 144 having an outer diametric wall 146, an inner diametric wall 147, and an end wall 149 that collectively define an annular coolant channel 150. In a manner similar to that described above, body member 144 is formed from a dielectric material. In accordance with one aspect of the exemplary embodiment, body member 144 is formed from plastic such as nylon or polyphenylene sulfide (PPS).

In accordance with the exemplary aspect shown, first sleeve member 134 includes an inlet member 160 shown in the form of a nozzle 161. Nozzle 161 is provided on outer diametric wall 146 and includes a metered orifice 163 that defines a first opening 165 that leads into annular coolant channel 150. First sleeve member 134 is also shown to include a second opening 170 formed in outer diametric wall 146 at a position substantially opposite to first opening 165. In addition, first sleeve member 134 includes a third opening 175 that is formed on inner diametric wall 147 adjacent to second opening 170. In a manner similar to that described above, first sleeve member 134 is configured to be mounted to stator 44 with first end winding portion 60 extending into annular coolant channel 150. First sleeve member 134 can be held in place by housing 4 or through various other mechanisms known to those of ordinary skill in the art.

With this arrangement, pressurized coolant, generally an oil, is introduced into housing 4 at inlet member 160. The coolant flows through metered orifice 163 and enters annular coolant channel 150 under pressure. The coolant flows over, through, and about first end winding portion 60 and absorbs heat. The coolant falls under a gravitational force, toward second opening 170 and passes from first sleeve member 134. At this point, entrained heat is removed and the coolant is re-circulated back toward inlet member 160. In addition to receiving coolant through inlet member 160, first sleeve member 134 may also received coolant through third opening 175. That is, any coolant that may pass toward rotor 30 is guided to third opening 175 and discharged from first sleeve member 134. In this manner, coolant does not enter into the air gap portion (not separately labeled) between the plurality of laminations 38 and stator 44 and lower operational efficiency of electric machine 2.

Reference will now be made to FIGS. 6 and 7, wherein like reference numbers represent corresponding parts in the respective views, in describing first and second sleeve members 185 and 190 in accordance with yet another aspect of the exemplary embodiment. As each sleeve member 185, 190 is similarly formed, a detailed description will follow describing first sleeve member 185 with an understanding that second sleeve member 190 includes corresponding structure. First sleeve member 185 includes a body member 194 having an outer diametric wall 196, an inner diametric wall 197, and an end wall 199 that collectively define an annular coolant channel 200. In a manner also similar to that described above, body member 194 is formed from a dielectric material. In accordance with one aspect of the exemplary embodiment, body member 194 is formed from plastic such as nylon or polyphenylene sulfide (PPS).

In accordance with the exemplary aspect shown, first sleeve member 185 includes an inlet member 210 shown in the form of a first nozzle 212. First nozzle 212 is provided on outer diametric wall 196 and includes a first metered orifice 215 that defines a first opening 217 that leads into annular coolant channel 200. First sleeve member 185 is also shown to include an outlet member 224 shown in the form of a second nozzle 228 formed in outer diametric wall 196 at a position substantially opposite to inlet member 210. Outlet member 224 includes second metered orifice 234 that defines a second opening 240. In a manner also similar to that described above, first sleeve member 134 is configured to be mounted to stator 44 with first end winding portion 60 extending into annular coolant channel 200. First sleeve member 185 can be held in place by housing 4 or through various other mechanisms known to those of ordinary skill in the art.

With this arrangement, coolant, generally an oil, is introduced into housing 4 at inlet member 210. The coolant flows through first metered orifice 215 and entering annular coolant channel 200 under pressure. The coolant flows over, through, and about first end winding portion 60 and absorbs heat. The pressurized coolant passes through coolant channel 200 under pressure toward outlet member 224. The fluid passes through second metered orifice 234 and exiting first sleeve member 185 under pressure. At this point, entrained heat is removed and the coolant is re-circulated back toward inlet member 210.

At this point it should be understood that the exemplary embodiment provides a system for enhancing contact between end winding portions of a stator and coolant to increase heat transfer. Prior art arrangements provide limited contact between coolant and the end windings due to inconsistencies in construction, differences in mounting, and other factors. The minimal contact with the coolant results in the formation of hot spots on the stator that have a negative impact on component operational life and machine efficiency. In contrast, the present exemplary embodiment bathes the end windings in coolant to enhance heat removal and prolong stator life as well as increase operational efficiency of the electric machine.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
    a housing;
    a stator mounted relative to the housing, the stator including a body having a first end portion that extends to a second end portion and a plurality of stator windings that extend between the first and second end portions; and
    a sleeve member mounted to the stator and covering a portion of the stator windings at one of the first and second end portions, the sleeve member including a body member having an outer diametric wall and an inner diametric wall that collectively define an annular coolant channel, an inlet opening formed in the outer diametric wall for receiving coolant and a discharge opening formed in the outer diametric wall for passing coolant from the sleeve member, the sleeve member being configured and disposed to guide a coolant over the portion of the stator windings to remove heat from the stator.

2. The electric machine according to claim 1, wherein the plurality of stator windings include end turn portions, the sleeve member covering the end turn portions of the plurality of stator windings at the one of the first and second end portions.

3. The electric machine according to claim 1, wherein the inlet opening includes a metered orifice that guides a pressurized flow of coolant onto the portion of the stator windings.

4. The electric machine according to claim 1, wherein the discharge opening includes a metered orifice for passing a pressurized flow from the sleeve member.

5. The electric machine according to claim 1, wherein the inner diametric wall includes an opening.

6. The electric machine according to claim 1, wherein the sleeve member is formed from a dielectric material.

7. The electric machine according to claim 6, wherein the dielectric material is plastic.

8. The electric machine according to claim 6, wherein the dielectric material is nylon.

9. The electric machine according to claim 6, wherein the dielectric material is polyphenylene sulfide (PPS) plastic.

10. The electric machine according to claim 1, wherein the sleeve member is operatively connected to the housing.

11. A method of cooling an electric machine stator, the method comprising:

guiding a coolant through an inlet formed in an outer diametric wall of a stator sleeve;

passing the coolant onto a portion of a plurality of stator windings of the electric machine stator;

flowing the coolant through an annular coolant channel defined by the outer diametric wall and an inner diametric wall of the stator sleeve circumferentially about the plurality of stator windings; and discharging the coolant through a discharge opening formed in the outer diametric wall of the stator sleeve.

12. The method of claim 11, wherein passing the coolant onto a portion of a plurality of stator windings includes passing the coolant onto end turn portions of the plurality of stator windings.

13. The method of claim 11, wherein, guiding the coolant through an inlet of a stator sleeve includes passing a pressurized flow of coolant into the stator sleeve.

14. The method of claim 11, further comprising: passing the coolant into a housing portion of the electric machine.

15. The method of claim 14, wherein discharging the cooling through the discharge opening in the stator sleeve includes passing a pressurized flow of coolant from the stator sleeve.

16. The method of claim 15, further comprising: flowing the coolant from an opening formed in the inner diametric wall of the stator sleeve onto a rotor of the electric machine.

* * * * *